United States Patent
Jiang et al.

(10) Patent No.: US 11,923,532 B2
(45) Date of Patent: Mar. 5, 2024

(54) PRE-LITHIATED SILICON-BASED ANODE, AND MANUFACTURING METHOD THEREOF

(71) Applicants: Robert Bosch GmbH, Stuttgart (DE); Rongrong Jiang, Stuttgart (DE)

(72) Inventors: Rongrong Jiang, Shanghai (CN); Jingjun Zhang, Shanghai (CN); Yuqian Dou, Shanghai (CN); Lei Wang, Shanghai (CN); Chuanling Li, Shanghai (CN); Yunhua Chen, Shanghai (CN); Xiaogang Hao, Shanghai (CN); Qiang Lu, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 99 days.

(21) Appl. No.: 16/605,720

(22) PCT Filed: Apr. 17, 2017

(86) PCT No.: PCT/CN2017/080769
§ 371 (c)(1),
(2) Date: Oct. 16, 2019

(87) PCT Pub. No.: WO2018/191843
PCT Pub. Date: Oct. 25, 2018

(65) Prior Publication Data
US 2021/0126250 A1    Apr. 29, 2021

(51) Int. Cl.
H01M 4/36    (2006.01)
H01M 4/02    (2006.01)
(Continued)

(52) U.S. Cl.
CPC ......... *H01M 4/366* (2013.01); *H01M 4/0421* (2013.01); *H01M 4/134* (2013.01);
(Continued)

(58) Field of Classification Search
CPC .... H01M 4/366; H01M 4/0421; H01M 4/134; H01M 4/1395; H01M 4/382;
(Continued)

(56) References Cited

U.S. PATENT DOCUMENTS 6,332,900 B1 *  12/2001  Muffoletto ............ H01M 4/043
                                                                29/623.5
8,801,810 B1 *   8/2014  Cui .................... H01M 10/0525
                                                                29/623.1
(Continued)

FOREIGN PATENT DOCUMENTS

CN    1447473 A    10/2003
CN    1447475 A    10/2003
(Continued)

OTHER PUBLICATIONS

EPO English Machine translations of JP 2016076332 originally published to Hasegawa Tomohiko on May 12, 2016 (Year: 2016).*
(Continued)

*Primary Examiner* — Cynthia H Kelly
*Assistant Examiner* — Niara Trant
(74) *Attorney, Agent, or Firm* — Maginot, Moore & Beck LLP

(57) ABSTRACT

A pre-lithiated silicon-based anode includes a silicon-based anode, lithium disposed on a surface or in an interior of the silicon-based anode, and a protective coating on the surface of the silicon-based anode. The pre-lithiated silicon-based anode allows subsequent processing to be performed safely in the atmosphere.

5 Claims, 1 Drawing Sheet

(51) Int. Cl.
    *H01M 4/04*    (2006.01)
    *H01M 4/134*    (2010.01)
    *H01M 4/1395*    (2010.01)
    *H01M 4/38*    (2006.01)
    *H01M 4/62*    (2006.01)
    *H01M 10/0525*    (2010.01)
    *H01M 10/0562*    (2010.01)

(52) U.S. Cl.
    CPC ......... *H01M 4/1395* (2013.01); *H01M 4/382* (2013.01); *H01M 4/386* (2013.01); *H01M 4/628* (2013.01); *H01M 10/0525* (2013.01); *H01M 10/0562* (2013.01); *H01M 2004/021* (2013.01); *H01M 2004/027* (2013.01); *H01M 2300/0068* (2013.01)

(58) Field of Classification Search
    CPC .. H01M 4/386; H01M 4/628; H01M 10/0525; H01M 10/0562; H01M 2004/021; H01M 2004/027; H01M 2300/0068
    See application file for complete search history.

(56) References Cited

U.S. PATENT DOCUMENTS

| | | | |
|---|---|---|---|
| 11,508,988 B2* | 11/2022 | Herle | H01M 4/134 |
| 2010/0173198 A1* | 7/2010 | Zhamu | H01M 4/587 |
| | | | 429/222 |
| 2011/0305958 A1 | 12/2011 | Kuriki | |
| 2013/0108914 A1 | 5/2013 | Kasahara et al. | |
| 2013/0171502 A1* | 7/2013 | Chen | H01G 11/32 |
| | | | 429/300 |
| 2014/0234715 A1* | 8/2014 | Fasching | H01M 4/04 |
| | | | 429/220 |
| 2015/0162602 A1 | 6/2015 | Dadheech et al. | |
| 2015/0357641 A1* | 12/2015 | Sugie | C01G 53/006 |
| | | | 429/223 |
| 2016/0172710 A1* | 6/2016 | Liu | H01M 10/0568 |
| | | | 429/126 |
| 2017/0301910 A1* | 10/2017 | Wang | H01M 10/052 |

FOREIGN PATENT DOCUMENTS

| | | | |
|---|---|---|---|
| CN | 103928704 A | | 7/2014 |
| CN | 104201320 A | | 12/2014 |
| CN | 104701487 A | | 6/2015 |
| JP | 2003297430 A | * | 10/2003 |
| JP | 2012-023027 A | | 2/2012 |
| JP | 2016-076332 A | | 5/2016 |
| WO | 2012/015033 A1 | | 2/2012 |
| WO | 2016/054105 A1 | | 4/2016 |

OTHER PUBLICATIONS

EPO English Machine Translation of JP 2003297430 originally published to Hashimoto Tsutomu on Oct. 17, 2003 (Year: 2003).*
International Search Report corresponding to PCT Application No. PCT/CN2017/080769, dated Jan. 9, 2018 (Chinese and English language document) (5 pages).

* cited by examiner

PRE-LITHIATED SILICON-BASED ANODE, AND MANUFACTURING METHOD THEREOF

This application is a 35 U.S.C. § 371 National Stage Application of PCT/CN2017/080769, filed on Apr. 17, 2017, the disclosure of which is incorporated herein by reference in its entirety.

The present disclosure relates to the technical field of batteries. Specifically, the present disclosure relates to an anode for a lithium ion battery and a method for preparing same, as well as a lithium ion battery containing the anode. More specifically, the present disclosure relates to a pre-lithiated silicon-based anode and a method for preparing same, and a lithium ion battery containing the pre-lithiated silicon-based anode.

BACKGROUND

Lithium ion batteries are a novel type of rechargeable battery, having advantages such as high voltage, high energy density and being environmentally friendly with no pollution, and have been eulogized as being "the most promising chemical power source". As the low-carbon economy moves through the initial stages of development with no prospect of weakening, lithium ion batteries are currently developing positively in the direction of motor vehicle motive power and electricity grid energy storage, etc.

One reason for the continuous decrease in energy in lithium ion batteries is the continuous consumption of lithium at the solid electrolyte interface (SEI). To deal with this problem, there have been attempts to use an electrolyte to stabilize the SEI.

It is also possible to solve this problem by producing a lithium reservoir in the anode. Additional lithium in a silicon anode can make up the lithium loss during cycling to form the SEI film. A silicon anode having additional lithium is a so-called pre-lithiated silicon anode. Compared with a battery having a silicon anode, a battery having a pre-lithiated silicon anode may have a higher initial efficiency and better cycle performance.

CN 104201320A has disclosed a pre-lithiation method, in particular a method for pre-lithiation of a negative electrode material, wherein an anode cavity of an electrolysis tank is a lithium-salt-containing aqueous solution or organic solution, and a cathode cavity is a lithium ion active material, placed in a lithium-ion-conducting organic electrolyte; a lithium-ion-conducting lithium ion conductor ceramic film, or a composite film of a lithium ion conductor and a macromolecular material, is used for separation between the cathode and anode; at normal temperature and pressure, a DC voltage is applied between the anode and cathode, and lithium ions in the organic phase or water phase of the anode cavity pass through the diaphragm having lithium ion conductivity under the driving action of the voltage, reach the organic solvent phase of the cathode, and enter the cathode lithium ion active material, completing pre-lithiation of the material, or forming an SEI film on a surface of the material.

However, a pre-lithiated silicon anode is very sensitive to moisture in the air, as the activity of lithium in air is very high. Furthermore, the rapid reaction of lithium (especially lithium powder) with the anode produces a large amount of heat. Thus, the processing of a pre-lithiated silicon anode might give rise to safety issues during production.

Due to the abovementioned issues, there are very exacting requirements regarding the pre-lithiation and subsequent processing of a silicon anode. Generally, subsequent processing of a pre-lithiated silicon anode must be carried out in a very dry environment (with a dew point lower than −40° C.), and this increases production costs.

Thus, those skilled in the art have for a long time been seeking an anode capable of solving the problem of the continuous decrease in energy in lithium ion batteries, and a cost-effective method of preparing same.

SUMMARY

The technical problem to be solved in the present disclosure is to provide an anode and a cost-effective method of preparing same, the anode being capable of solving the problem of the continuous decrease in energy in lithium ion batteries.

The problem to be solved in the present disclosure is solved through the following technical solution:

According to a first aspect of the present disclosure, a pre-lithiated silicon-based anode for a lithium ion battery is provided, containing:

a silicon-based anode;

lithium disposed on a surface or in an interior of the silicon-based anode; and a protective coating on a surface of the silicon-based anode.

According to a second aspect of the present disclosure, a method for preparing the pre-lithiated silicon-based anode is provided, comprising the following steps:

i) providing a silicon-based anode;

ii) applying lithium to a surface or an interior of the silicon-based anode; and iii) forming a protective coating on the silicon-based anode.

According to a third aspect of the present disclosure, a lithium ion battery is provided, containing the pre-lithiated silicon-based anode, a cathode and an electrolyte.

According to a fourth aspect of the present disclosure, a method for preparing a lithium ion battery is provided, comprising the following steps:

i) using the method in the second aspect of the present disclosure to prepare a pre-lithiated silicon-based anode;

ii) preparing a cathode; and iii) stacking and assembling the pre-lithiated silicon-based anode and cathode with a solid electrolyte to obtain the lithium ion battery.

The protective coating can slow down a reaction between lithium and the silicon-based anode during electrolyte injection, reducing the production of heat. Due to the presence of the protective coating, the pre-lithiated anode of the present disclosure can be processed safely in air. The resistance of the electrode to moisture can be greatly increased, therefore pre-lithiated silicon anodes can be stored in large-scale production.

The pre-lithiated anode of the present disclosure may be used as an anode of a lithium ion battery and a solid-state battery. A battery containing the pre-lithiated anode may be used in a motor vehicle.

The lithium ion battery obtained via the present disclosure has a higher energy density and a longer cycle life.

Other aspects of the present disclosure and further objects, features and advantages thereof will be embodied more comprehensively hereinbelow.

DETAILED DESCRIPTION

Figure 1:
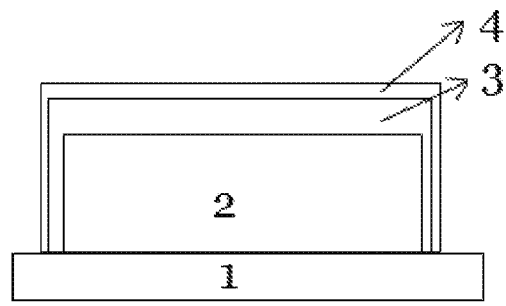
FIG. 1 shows schematically a pre-lithiated silicon-based anode according to an embodiment of the present disclosure, wherein 1: copper foil; 2: silicon-based anode; 3: Li; 4: LiPON.

The technical solution of the present disclosure is described in detail below.

The problem to be solved in the present disclosure is solved through the following technical solution:

According to a first aspect of the present disclosure, a pre-lithiated silicon-based anode for a lithium ion battery is provided, containing:

a silicon-based anode;
lithium disposed on a surface or in an interior of the silicon-based anode; and
a protective coating on a surface of the silicon-based anode.

In the description of the present application, the silicon-based anode may be any anode containing elemental silicon, a silicon alloy or a silicon compound.

The elemental silicon may be monocrystalline silicon, polycrystalline silicon or amorphous nano silicon, etc.

An alloy comprising at least one selected from tin, aluminum, nickel, copper, iron, cobalt, manganese, zinc, indium, silver, titanium, germanium, bismuth, antimony and chromium as a second element other than silicon may be mentioned as a silicon alloy.

A compound comprising oxygen and carbon may be mentioned as a silicon compound, and a compound of silicon may comprise an element selected from tin, nickel, copper, iron, cobalt, manganese, zinc, indium, silver, titanium, germanium, bismuth, antimony and chromium in addition to silicon.

Examples of silicon alloys or compounds include $SiB_4$, $SiB_6$, $Mg_2Si$, $Ni_2Si$, $TiSi_2$, $MoSi_2$, $CoSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v (0<v\leq 2)$, $SnO_w (0<w\leq 2)$ and $LiSiO$, etc.

In addition to silicon, the silicon-based anode may contain another anode active material, such as graphite, etc.

Lithium powder, lithium oxide powder or lithium carbide powder/nitride powder usually used in anodes may serve as the lithium used for lithiation.

The weight of lithium in the pre-lithiated silicon-based anode is 0.05-10%, preferably 2-7%, more preferably 3-5% of the weight of silicon in an electrode.

The protective coating may consist of a material which has electrical conductivity and is stable in air. The material may include but is not limited to lithium phosphorus oxynitride (LiPON), and an inorganic solid electrolyte based on an oxide or a phosphoric acid salt, such as LLZO, lithium silicon phosphate and alumina, etc.

The thickness of the protective coating is less than or equal to 5 microns, preferably less than or equal to 2 microns, and more preferably less than or equal to 1 micron.

According to a second aspect of the present disclosure, a method for preparing the pre-lithiated silicon-based anode is provided, comprising the following steps:

i) providing a silicon-based anode;
ii) applying lithium to a surface or an interior of the silicon-based anode; and
iii) forming a protective coating on the silicon-based anode.

The preparation of the silicon-based anode may be carried out by a known method in the art.

The silicon-based anode may be obtained by purchasing or obtained by preparing it by oneself.

In one embodiment, the silicon-based anode is prepared by the following:

coating an anode substrate with an anode slurry containing a silicon material and optionally another anode active material, an electrically conductive additive and a binder, and drying, rolling and cutting to obtain the silicon-based anode.

An anode slurry may be prepared by dissolving or dispersing a silicon material and optionally another anode active material, an electrically conductive additive and a binder in a solvent.

The silicon material is selected from elemental silicon, a silicon alloy or a silicon compound as defined above.

The other anode active material may be an active material commonly used in anodes, such as graphite, etc.

The electrically conductive additive may be an electrically conductive additive commonly used in the field of lithium ion battery preparation, such as a graphite conductive agent, e.g. KS-6, KS-15, SFG-6 or SFG-15; a carbon black conductive agent, e.g. acetylene black, Super P, Super S, 350G, carbon fiber (VGCF), carbon nanotubes (CNT) or Ketjenblack; graphene, etc.

The binder may be a binder commonly used in the field of lithium ion battery preparation, such as polyvinylidene fluoride (PVDF), polyvinyl alcohol (PVA), polytetrafluoroethylene (PTFE), sodium carboxymethylcellulose (CMC) and sodium polyacrylate (NaPAA), etc.

The solvent may be a solvent commonly used in the field of lithium ion battery preparation, such as N-methylpyrrolidone (NMP) and water, etc.

The anode substrate is an anode substrate commonly used in lithium ion batteries, such as copper foil.

In one embodiment, during preparation of the silicon-based anode, a silicon material and graphite are used as anode active materials, and the mass ratio of the silicon material, the graphite, the electrically conductive additive and the binder is 5-80:10-85:0.5-20:1:20, preferably 5-20:60-80:3-10:3-10.

In one embodiment, the mass ratio of the silicon material, the graphite, the electrically conductive additive and the binder is 4:4:1:1.

The coating, drying, rolling and cutting in the anode preparation process may be carried out according to known process parameters in the art.

For example, the drying may employ constant-temperature heating drying, rotary evaporation drying or spray drying.

In one embodiment, drying may be carried out for 5 h in a vacuum at 85° C.

For example, the rolling may be rolling under a pressure of 5 MPa.

The method of applying lithium is not subject to special restrictions. For example, application may be carried out by a vapor phase method, a liquid phase method, a spray-coating method, a calcination method or a combination thereof.

A physical deposition method or a chemical deposition method may be used as a vapor phase method. In particular, a vacuum evaporation method, a sputtering method, an ion plating method, a laser ablation method, thermochemical vapor phase deposition or a plasma chemical vapor phase deposition method, etc. may be used.

An electroplating method and a chemical plating method may be used as a liquid phase method.

A calcination method may consist of mixing an active substance and a binder to form a mixture, dispersing the mixture in a solvent, coating, and then heating the mixture at a temperature higher than the melting point of the binder. A known atmospheric calcination method, reactive calcination method or thermocompression calcination method may be used.

In a preferred embodiment, lithium is applied to the surface of the silicon-based anode by a deposition method. Lithium can be deposited on the surface of the silicon-based anode in a vacuum at 220-250° C. During deposition, the amount of lithium is controlled by the deposition time.

It is also possible to add lithium or a lithium compound to the interior of the silicon-based anode. For example, lithium powder, lithium oxide or lithium carbide powder is added during electrode preparation, including addition in an early-stage slurry-stirring process and during late-stage rolling.

The method of forming the protective coating is not subject to restrictions, e.g. may be physical or chemical vapor phase deposition, e.g. sputtering, pulse laser deposition or e.g. the method described in patent CN1447473A or CN1447475A.

Those skilled in the art understand very well how to control the thickness of the protective coating by controlling process parameters. For example, during physical vapor phase deposition, the thickness of the protective coating is controlled by current and time.

According to a third aspect of the present disclosure, a lithium ion battery is provided, containing the pre-lithiated silicon-based anode, a cathode and an electrolyte.

According to a fourth aspect of the present disclosure, a method for preparing a lithium ion battery is provided, comprising the following steps:
i) using the method in the second aspect of the present invention disclosure to prepare a pre-lithiated silicon-based anode;
ii) preparing a cathode; and
iii) stacking and assembling the pre-lithiated silicon-based anode and cathode with a solid electrolyte to obtain the lithium ion battery.

According to one embodiment, a solid-state lithium ion battery is prepared according to the following:
a) providing a silicon-based anode;
b) applying lithium to a surface or an interior of the silicon-based anode;
c) forming a protective coating on the silicon-based anode to obtain a pre-lithiated silicon-based anode;
d) providing a cathode; and
e) stacking and assembling the pre-lithiated silicon-based anode and cathode with a solid electrolyte to obtain the lithium ion battery.

Those skilled in the art will understand that the step of obtaining the pre-lithiated silicon-based anode and the step of obtaining the cathode are not subject to any requirement regarding order; the pre-lithiated silicon-based anode may be prepared first, or the cathode may be prepared first, or the pre-lithiated silicon-based anode and the cathode may be prepared at the same time.

The cathode may be obtained by purchasing or obtained by preparing it by oneself.

The method of preparing the cathode is a method usually used in the art. The cathode material is a cathode material commonly used in lithium ion batteries, such as NCM111, NCM523, NCM622, NCM811, NCA, Li-enriched NCM, LiFePO$_4$, LiCoO$_2$ and LiMn$_2$O$_4$, etc.

A sheet of the abovementioned material may be used directly as the cathode.

It is also possible to formulate a cathode material as a cathode slurry, coat a cathode substrate with the cathode slurry so obtained, and perform drying, rolling and cutting to obtain the cathode.

The cathode slurry may be formulated by dissolving or dispersing a cathode active material, an electrically conductive additive and a binder in a solvent.

In one embodiment, the cathode slurry is prepared according to the following: mixing a cathode material, an electrically conductive additive and a binder, and dissolving or dispersing a mixture so obtained in a solvent.

The electrically conductive additive may be an electrically conductive additive commonly used in the field of lithium ion battery preparation, such as a graphite conductive agent, e.g. KS-6, KS-15, SFG-6 or SFG-15; a carbon black conductive agent, e.g. acetylene black, Super P, Super S, 350G, carbon fiber (VGCF), carbon nanotubes (CNT) or Ketjenblack; graphene, etc.

The binder may be a binder commonly used in the field of lithium ion battery preparation, such as polyvinylidene fluoride (PVDF), polyvinyl alcohol (PVA) and polytetrafluoroethylene (PTFE), etc.

The solvent may be a solvent commonly used in the field of lithium ion battery preparation, such as N-methylpyrrolidone (NMP) and water, etc.

Those skilled in the art can easily formulate amounts of cathode material, electrically conductive additive and binder as required.

The cathode substrate is a cathode substrate commonly used in solid-state lithium ion batteries, such as aluminum foil.

The solid electrolyte may be a polymer electrolyte and an inorganic ceramic electrolyte, e.g. a PEO-based polymer electrolyte, and a sulfide solid electrolyte. The following for example may be mentioned as solid electrolytes: a NASICON lithium ion conductor $Li_{1+x}Ti_{2-x}M_x(PO_4)O_3$, $Li_{1+x}Ge_{2-x}M_x(PO_4)_3$ (0.1<x<0.7, M=Al, Ga, In, Sc); a perovskite lithium ion conductor $Li_{3x}La_{(2/3)-x}TiO_3$ (0<x<0.16); a LISICON lithium ion conductor $Li_{14}ZnGe_4O_{16}$; a garnet lithium ion conductor $Li_5La_3M_2O_{12}$ (M=Ta/Nb), $Li_7La_3Zr_2O_{12}$; a glass ceramic electrolyte $Li_2S$—$SiS_2$—$Li_3PO_4$, $Li_7P_3S_{11}$, $Li_{10}GeP_2S_{12}$, etc.

The formulation of the slurry, coating, drying, rolling and cutting in the cathode preparation process and the stacking and assembly in the battery preparation process may be carried out according to known process parameters in the art.

For example, the drying may employ constant-temperature heating drying, rotary evaporation drying or spray drying.

For example, the rolling may be rolling under a pressure of 12 MPa.

The terms "containing" and "comprising" as used in the description of the present application encompass situations which further contain or comprise other key elements which are not explicitly mentioned, and situations formed by the key elements mentioned.

Reference documents such as CN1447473A and CN1447475A mentioned in the description of the present application are incorporated in their entirety herein by reference.

EXAMPLES

The concept of the present disclosure and the technical effects produced thereby are explained further below in conjunction with examples and the accompanying drawings, to enable those skilled in the art to fully understand the object, features and effects of the present disclosure. It should be understood that some embodiments are merely schematic, and do not constitute a limitation of the scope of the present disclosure.

Comparative Example 1

This comparative example is not an example of the present disclosure, wherein a silicon-based anode does not undergo pre-lithiation.

1. Preparation of Silicon-Based Anode

A silicon material, graphite, carbon black and a binder (NaPAA) are mixed in the mass ratio of silicon material (Si—Ti—Al alloy):graphite:carbon black:binder (NaPAA)=40:40:10:10 to obtain 100 g of a mixture, which is dispersed in 100 g of deionized water, and thoroughly stirred evenly to obtain an anode slurry.

A 15-micron-thick copper foil is coated with the slurry, to a coating thickness of 100 microns. After drying for 5 h in a vacuum oven at 85° C., rolling (with the pressure kept at 5 MPa) and then cutting are performed to obtain a silicon-based anode.

2. Deposition of Protective Coating

The preparation of a LiPON thin film is completed in a coating system; a flow ratio of working gases $N_2$ and Ar is controlled by means of a mass flow rate controller, a working pressure is 2-10 Pa, an RF power is continuously adjustable within a range of 250-450 W, a deposition rate is about 8 um/h, a substrate is not separately heated in thin film deposition, and the maximum temperature increase caused by the substrate being subjected to thermal radiation is 250° C. An electron beam heating method is used in combination with a nitrogen plasma generator; an $Li_3PO_4$ substrate is used, and LiPON is deposited on the silicon-based anode obtained above having lithium deposited on a surface thereof, to obtain a 2 μm LiPON film.

Using an NCM111 material (composed of the three transition metal elements nickel, cobalt and manganese in the molar ratio 1:1:1, with molecular formula $LiNi_{1/3}Mn_{1/3}Co_{1/3}O_2$) as a cathode active material, the lithium nickel cobalt manganese oxide, carbon black and a binder are mixed in a mass ratio of NCM111:carbon black:binder (PVDF)=96.5:1.5:2.0 to obtain 100 g of a mixture, which is dispersed in 70 g of N-methyl-2-pyrrolidone (NMP), and thoroughly stirred evenly to obtain a cathode slurry. A 15-micron-thick aluminum foil is coated with the slurry, to a coating thickness of 250 microns. After drying for 5 h in a vacuum oven at 85° C., rolling (with the pressure kept at 12 MPa) and then cutting are performed to obtain a lithium nickel cobalt manganese oxide cathode.

The anode and cathode so obtained are stacked with a PE-based diaphragm and undergo battery assembly to obtain a lithium ion battery. The lithium ion battery so obtained undergoes formation by being charged/discharged 4 times at a current of 1 C, then undergoes a charge/discharge cycle performance test at a current of 1 C. See FIG. 2 for the cycle performance so obtained. Test results are collected in table 1.

Example 1

This example is an example of the present disclosure, wherein a silicon-based anode undergoes pre-lithiation.

1. Preparation of Silicon-Based Anode

A silicon material, graphite, carbon black and a binder (NaPAA) are mixed in the mass ratio of silicon material (Si—Ti—Al alloy):graphite:carbon black:binder (NaPAA)=40:40:10:10 to obtain 100 g of a mixture, which is dispersed in 100 g of deionized water, and thoroughly stirred evenly to obtain an anode slurry. A 15-micron copper foil is coated with the slurry, to a coating thickness of 100 microns. After drying for 5 h in a vacuum oven at 85° C., rolling (with the pressure kept at MPa) and then cutting are performed to obtain a silicon-based anode.

2. Thermal Deposition of Li

The preparation of an Li thin film is completed in a coating system; an electron beam heating evaporation power is about 300 W, a deposition rate is about 36 um/h, a substrate is not separately heated in thin film deposition, and the maximum temperature increase caused by the substrate being subjected to thermal radiation is 250° C. Pure lithium is used as a lithium material for pre-lithiation. Lithium is deposited on the silicon-based anode obtained above in a vacuum at 220° C.; the deposition time is 10 minutes. The weight of lithium is 5% of the weight of silicon in the electrode.

3. Deposition of Protective Coating

The preparation of a LiPON thin film is completed in a coating system; a flow ratio of working gases $N_2$ and Ar is controlled by means of a mass flow rate controller, a working pressure is 2-10 Pa, an RF power is continuously adjustable within a range of 250-450 W, a deposition rate is about 8 um/h, a substrate is not separately heated in thin film deposition, and the maximum temperature increase caused by the substrate being subjected to thermal radiation is 250° C. An electron beam heating method is used in combination with a nitrogen plasma generator, and LiPON is deposited on the silicon-based anode obtained above having lithium deposited on a surface thereof, to obtain a 2 μm LiPON film. For the specific deposition process, CN1447473A may be referred to.

The schematic structure of the LiPON-protected pre-lithiated silicon-based anode so obtained is as shown in FIG. 1; it may undergo subsequent processing in air. The anode may be kept in air for one week.

Using an NCM111 material (composed of the three transition metal elements nickel, cobalt and manganese in the molar ratio 1:1:1, with molecular formula $LiNi_{1/3}Mn_{1/3}Co_{1/3}O_2$) as a cathode active material, the lithium nickel cobalt manganese oxide, carbon black and a binder are mixed in a mass ratio of NCM111:carbon black:binder (PVDF)=96.5:1.5:2.0 to obtain 100 g of a mixture, which is dispersed in 70 g of N-methyl-2-pyrrolidone (NMP), and thoroughly stirred evenly to obtain a cathode slurry. A 15-micron-thick aluminum foil is coated with the slurry, to a coating thickness of 250 microns. After drying for 5 h in a vacuum oven at 85° C., rolling (with the pressure kept at 12 MPa) and then cutting are performed to obtain a lithium nickel cobalt manganese oxide cathode.

The anode and cathode so obtained are stacked with a PE-based diaphragm and undergo battery assembly to obtain a lithium ion battery. The lithium ion battery so obtained undergoes formation by being charged/discharged times at a current of 0.1 C, then undergoes a charge/discharge cycle performance test at a current of 1 C. See FIG. 2 for the cycle performance so obtained. Test results are collected in table 1.

TABLE 1

Cycle performance of battery obtained

| Example | Service life (no. of cycles) | ICE (%) | 1 C/0.1 C rate performance |
|---|---|---|---|
| Comparative example 1 | 77 | 81 | 92 |
| Example 1 | 200 | 80.3 | 91 |

Figure 2:
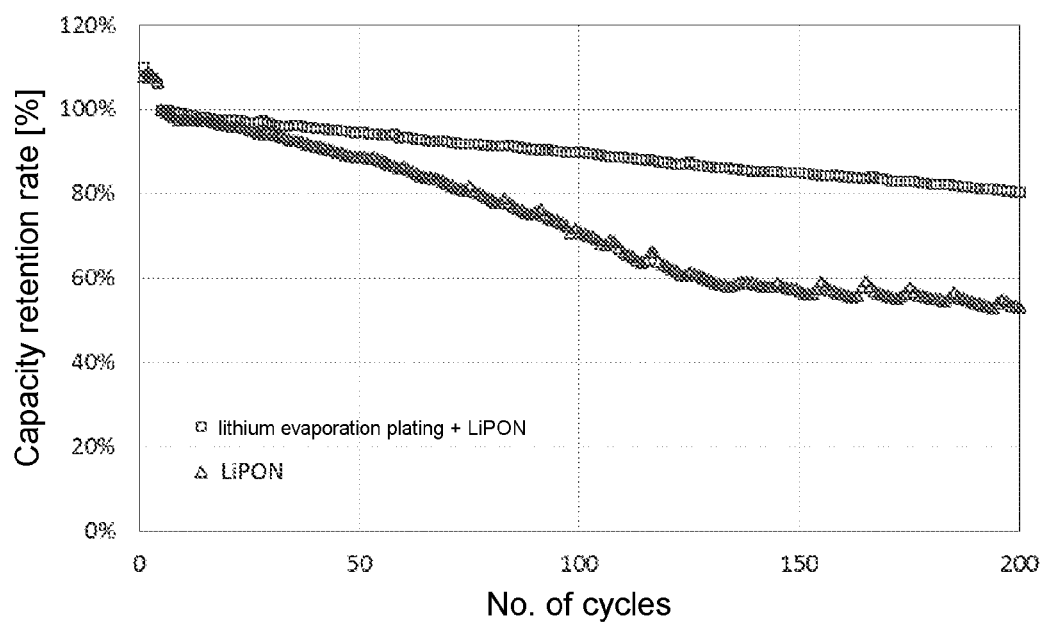
FIG. 2 shows a cycle performance comparison of a battery containing a pre-lithiated silicon-based anode obtained in example 1 and a battery containing a silicon-based anode obtained in comparative example 1.

It can be seen from FIG. 2 and table 1 that: when LiPON protection is performed after pre-lithiation on a silicon base, the first charge/discharge efficiency and 1 C/0.1 C rate characteristic of the battery stay substantially the same as those of a silicon-based battery which only has LiPON protection, but the cycle life of the battery is more than doubled.

Although some aspects of the present disclosure have already been displayed and discussed, those skilled in the art should realize that the abovementioned aspects may be altered without departing from the principle and spirit of the present disclosure, therefore the scope of the present disclosure shall be defined by the claims and equivalent content.

The invention claimed is:

1. A method for preparing a pre-lithiated silicon-based anode, comprising:

providing a pressed and cut silicon-based anode with lithium disposed on at least one of an outer surface and an interior surface of the pressed and cut silicon-based anode; and forming a protective coating on the provided pressed and cut silicon-based anode.

2. The method as claimed in claim 1, wherein:

the disposition applying of the lithium includes depositing the lithium on the outer surface of the pressed and cut silicon-based anode; and the forming of the protective coating includes forming the protective coating on the lithium on the outer surface of the pressed and cut silicon-based anode.

3. The method as claimed in claim 1, wherein the lithium is disposed adding lithium powder, lithium oxide, or lithium carbide powder in an early-stage slurry-stirring process or during late-stage rolling.

4. The method as claimed in claim 2, wherein the deposition of the lithium is carried out in a vacuum at 220-250° C.

5. The method as claimed in claim 1, further comprising:

providing a cathode; and stacking and assembling the pre-lithiated silicon-based anode and the cathode with a solid electrolyte to form a lithium ion battery.

* * * * *